United States Patent Office 3,022,307
Patented Feb. 20, 1962

3,022,307
PIGMENT DYESTUFFS FROM 1-N-(Bz-1'-BENZ-ANTHRONYL) - AMINOANTHRAQUINONES BY ACID CONDENSING AGENTS
Ernst Gutzwiller, Basel, Switzerland, assignor, by mesne assignments, to Saul & Co., Newark, N.J., as nominee of Fidelity Union Trust Company, executive trustee under Sandoz Trust
No Drawing. Filed July 6, 1953, Ser. No. 366,386
Claims priority, application Switzerland July 11, 1952
6 Claims. (Cl. 260—274)

The present invention relates to pigment dyestuffs of the 1-N-(Bz - 1' - benzanthronyl) - aminoanthraquinone series.

In accordance with the present invention, the 1-N-(Bz-1' - benzanthronyl) - aminoanthraquinones — which have already been proposed for use as pigment dyestuffs—are converted with the aid of acid condensing agents into new and valuable pigment dyestuffs, which are different from the starting compounds as well as from the condensation products obtained when the 1-N-(Bz-1'-benzanthronyl)-aminoanthraquinones are treated with alkaline condensing agents.

The new pigments of the present invention, which can be prepared in the form of pastes or powders, are useful for dyeing paper and synthetic fibers in pulp or bulk form, for the manufacture of wall-paper, for the printing of textiles, for the production of paints, and for working into lacquers, rubber, etc. The properties of these pigments and the fact that the condensation is followed by a hypsochromic effect lead to the view that a ring closure occurs.

Suitable starting 1-N-(Bz - 1' - benzanthronyl)-aminoanthraquinones are those wherein there are one or more N-(Bz-1'-benzanthronyl)-amino groups in the α-positions of the anthraquinone radical and wherein the benzanthrone as well as the anthraquinone radicals may carry additional substituents, other than N-acylamino groups, and/or condensed-on rings. 1-N-(Bz-1'-benzanthronyl)-aminoanthraquinones with condensed-on rings are, for example, the 1-N-(Bz - 1' - benzanthronyl)-aminoanthraquinoneacridones, the 1-N-(Bz-1'-benzanthronyl)-aminoisothiazoleanthrones, the 1-N-(Bz - 1' - benzanthronyl)-aminoanthrapyridones, the 1-N-(Bz-1' - benzanthronyl)-aminoanthrapyrimidines, the 1-N-(Bz-1'-benzanthronyl)-aminoanthrapyridines, etc.

Suitable acid condensing agents for use according to the present invention are for example metal halides such as aluminum chloride or bromide and fusions thereof with alkali metal salts, and sulfuric acid. Especially suitable is sulfuric acid of 90 to 100% strength since, when this condensing agent is employed, the formation of the new dyestuffs and their precipitation in finely subdivided form take place in a single operation. The conversion of the 1-N-(Bz-1'-benzanthronyl)-aminoanthraquinones into the new pigment dyestuffs takes place, although slowly, at room temperature (e.g. 20 to 30° C.) and at an accelerated rate at higher temperatures, preferably at 50 to 120° C., the conditions being so selected that the reaction products do not become water-soluble. In order to isolate the pigment dyestuffs, the sulfuric acid solutions thereof are poured into thoroughly stirred water in the presence, if desired, of an oxidizing agent such for example as sodium chlorate, sodium chromate, sodium bichromate, etc.

The following examples set forth representative embodiments of the invention, and are intended to be illustrative but not limitative in character. In these examples, the parts are parts by weight, the percentages are percentages by weight, and the temperatures are in degrees centigrade.

*Example 1*

200 parts of 1-N-(Bz-1'-benzanthronyl)-aminoanthraquinone—prepared by the condensation of one mol of Bz-1-bromobenzanthrone with one mol of 1-aminoanthraquinone—are stirred into 1100 parts of sulfuric acid of 93 to 96% strength, whereupon the resultant solution is heated to 80–110° until the ensuing conversion is concluded. The reaction mass—after being cooled to 40–60°—is then poured, in the form of fine jets, into approximately 10,000 parts of water at 60–70° while stirring vigorously, stirring being continued for an additional hour. The precipitated pigment dyestuff is then filtered off, washed neutral, and then worked up for example in a roller mill with a dispersing agent, such for example as the condensation product of naphthalene sulfonic acid and formaldehyde, into the form of a pigment paste, which dyes viscose in the spinning mass in vivid, strong, brownish golden-orange shades which are characterized by good fastness properties. The pigment paste can also be employed for the coloring of paper in the pulp state, for the manufacture of wall-paper, for the printing of cotton, etc. The pigment paste can also be converted into pigment powder form by treatment, if necessary after dilution with water, in an atomization drier.

If it is desired to obtain the pigment dyestuff in pure form, the sulfuric acid solution is slowly diluted, after being heated to 80–110° and while stirring, with sufficient water to produce a sulfuric acid of 80–85% strength. The pigment dyestuff which separates out in crystalline form is filtered off at room temperature with the aid of a glass suction filter and then washed several times with sulfuric acid of 70–80% strength. The filter cake is taken up in 2500 parts of water, heated to 95–100°, filtered off, washed neutral and dried. The dried dyestuff is then dissolved in the six-fold quantity of sulfuric acid monohydrate and then, while stirring thoroughly, poured into such quantity of water that a sulfuric acid of 10–15% strength is produced. The again precipitated pigment dyestuff is filtered off, washed neutral, and worked up into the form of a pigment paste or pigment powder. Viscose dyed therewith in the spinning mass is a vivid golden orange.

*Example 2*

25 parts of 1-N-(Bz-1'-benzanthronyl)-amino-6,7-dichloroanthraquinone, prepared by the condensation of one mol of Bz-1-bromobenzanthrone with one mol of 1-amino-6,7-dichloroanthraquinone, are stirred into 150 parts of sulfuric acid of 93–100% strength. The sulfuric acid solution is heated to 70–110° until there is no further dyestuff formation; it is then cooled to 40–60° and poured in the form of fine jets into 1500 parts of water maintained in a state of vigorous agitation, and then stirring of the entire mass is continued for some time longer. The thus-obtained dyestuff is filtered off, washed neutral and worked up, in a homogenizing machine, with a suitable dispersing agent, into the form of a pigment paste which, if desired can be converted into the form of a pigment powder by drying in an atomization drier. The pigment dyestuff dyes paper and artificial silk in the pulp or bulk form in vivid red-brown shades of excellent fastness properties. Corresponding pigment prints on textiles also possess very good properties.

If it is desired to obtain the pure pigment dyestuff, the sulfuric acid solution, after heating it to 70–110°, is slowly diluted at the said temperature and while stirring vigorously, with such quantity of water or dilute sulfuric acid that a sulfuric acid of 80–85% strength results; after cooling the whole is suction-filtered through a glass filter and the precipitate is washed several times with sulfuric acid of 75% strength. The filter cake is worked up, after the manner described in Example 1, into the form of a pigment paste or pigment powder. In the spin-dyeing of viscose, the purified pigment dyestuff produces vivid red-brown shades of excellent fastness properties.

If, in place of the 1-N-(Bz-1'-benzanthronyl)-amino-6,7-dichloroanthraquinone, use is made of an equivalent amount of 1-N-(Bz-1'-benzanthronyl)-amino-6-monofluoroanthraquinone or of 1-N-(Bz-1'-benzanthronyl)-amino-6-monochloro-anthraquinone or of 1-N-(Bz-1'-benzanthronyl)-amino-7-monochloro - anthraquinone or of 1-N-(Bz-1'-benzanthronyl)-amino - 6 - monobromoanthraquinone or of 1-N-(Bz-1'-benzanthronyl)-7- monobromo-anthraquinone, the corresponding pigment dyestuffs are obtained. They possess properties similar to those of the product of the preceding paragraph.

*Example 3*

25 parts of 1-N-(Bz-1'-benzanthronyl)-amino-2-methylanthraquinone, prepared by the condensation of one mol of Bz-1-bromobenzanthrone with one mol of 1-amino-2-methylanthraquinone, are stirred into the five- to seven-fold quantity of sulfuric caid of 92–100% strength. The sulfuric acid solution is heated to 70–100° for 1 to 3 hours and then, after cooling to 30–60°, is poured into 2000 parts of water maintained vigorously agitated. After stirring the resultant suspension for some additional time, the precipitate is filtered off and washed neutral. The obtained pigment dyestuff is worked up into the form of a pigment paste or powder. When used for textile printing, or for coloring paper or artificial silk in the pulp or bulk state, it yields beautiful, fast brown shades.

A similar dyestuff is obtained when, while otherwise proceeding according to the preceding paragraph, the 25 parts of 1-N-(Bz-1'-benzanthronyl)-amino-2-methylanthraquinone is replaced by the equivalent amount of 1-N-(Bz-1'-benzanthronyl) - amino - 2 - bromoanthraquinone.

*Example 4*

25 parts of 1,8-di-N,N-(Bz-1'-benzanthronyl)-aminoanthraquinone, prepared by the condensation of two mols of Bz-1-bromobenzanthrone and one mol of 1,8-diaminoanthraquinone, are dissolved in the five- to eight-fold quantity of sulfuric acid of 95–100% strength. The sulfuric acid solution is heated to 90–120° for several hours, and it is then poured into the ten-fold quantity of water, maintained in a state of rapid agitation. The precipitated violet-brown pigment dyestuff is worked up into the form of a paste or powder, which yield dyeings and prints of excellent fastness properties.

By proceeding as described in the foregoing paragraph, but replacing the 1,8-di-N,N-(Bz-1'-benzanthronyl)-aminoanthraquinone by the equivalent quantity of 1,5-di-N,N-(Bz-1'-benzanthronyl) - aminoanthraquinone or of the technical mixture of 1,5- and 1,8-derivatives or of the technical mixture of 1,5 - (8) - di - N,N-(Bz-1'-benzanthronyl)-amino-2-methylanthraquinone or of 1,5-di-N,N-(Bz-1'-benzanthronyl)-amino - 4,8 - dihydroxy-anthraquinone or of 1,5-di-N,N-(Bz-1'-benzanthronyl)-amino-4,8-dimethoxyanthraquinone, the corresponding pigment dyestuffs are obtained.

*Example 5*

20 parts of 1 - N - (6'-bromo-Bz-1'-benzanthronyl)-aminoanthraquinone, prepared by the condensation of one mol of 6-Bz-1-dibromobenzanthrone with one mol of 1-aminoanthraquinone, are dissolved, with stirring, in the six- to eight-fold quantity of 92–98% sulfuric acid. The sulfuric acid solution is heated for several hours to 70–110°, and then poured after the manner previously described into the ten-fold quantity of water at 40–70°. The so-obtained brown pigment dyestuff is isolated and worked up into the form of a pigment paste or pigment powder which yield dyeings and prints of excellent properties.

If, while otherwise proceeding as described in the foregoing paragraph, the 1-N-(6'-bromo-Bz-1'-benzanthronyl)-aminoanthraquinone is replaced by the equivalent quantity of 1-N-(6'-chloro-Bz-1'-benzanthronyl)-aminoanthraquinone (prepared by the condensation of one mol of 6-Bz-1-dichlorobenzanthrone with one mol of 1-aminoanthraquinone) or of 1-N-(6'-bromo-Bz-1'-benzanthronyl)-amino-6,7-dichloro-anthraquinone (prepared by the condensation of one mol of 6-Bz-1-dibromobenzanthrone with one mol of 1-amino-6,7-dichloroanthraquinone) or of 1-N-(6'-bromo-Bz-1'-benzanthronyl)-amino-5-aminoanthraquinone (prepared by the condensation of one mol of 6-Bz-1-dibromobenzanthrone with one mol of 1,5-diaminoanthraquinone), similar pigment dyestuffs are obtained.

*Example 6*

25 parts of 1-N-(Bz-1'-benzanthronyl)-amino-5,10-isothiazoleanthrone, prepared by the condensation of one mol of Bz-1-bromobenzanthrone with one mol of 1-amino-5,10-isothiazoleanthrone, are dissolved in the eight-fold quantity of sulfuric acid of 96–98% strength. The solution is stirred at 70–100° until the conversion is complete, whereupon the product is worked up after the manner described in the foregoing examples. Viscose, spin-dyed with the thus-obtained pigment dyestuff is brown-red.

*Example 7*

25 parts of 1-N-(Bz-1'-benzanthronyl)-amino-anthraquinone are added at 50° to a mixture of 100 parts of anhydrous aluminum chloride and 250 parts of distilled nitrobenzene. The reaction mixture is then stirred at 100–110° until the condensation is complete, which should be the case after several hours. After the addition of 200 parts of concentrated hydrochloric acid, the nitrobenzene is distilled off with steam, the pigment dyestuff then filtered off, washed with hot water and dried. The dried dyestuff is dissolved in the five-fold to eight-fold quantity of sulfuric acid monohydrate, then poured after the manner described in the preceding examples into vigorously agitated water and then worked up into the form of a pigment paste or powder. Viscose spin-dyed with the thus-prepared product is brownish golden-orange.

The identical dyestuff is obtained when, in the preceding paragraph, aluminum bromide is used in place of aluminum chloride, or when the mixture of aluminum chloride and nitrobenzene is replaced by a fusion of aluminum chloride and sodium chloride.

*Example 8*

30 parts of 1-N-(Bz-1'-benzanthronyl)-amino-5-aminoanthraquinone, prepared by the condensation of one mol of Bz-1-bromobenzanthrone with one mol of 1,5-diaminoanthraquinone, are stirred into the six- to eight-fold quantity of sulfuric acid of 93–98% strength. The sulfuric acid solution is heated to 70–100° for several hours and then poured into such quantity of vigorously stirred water at 20–50° that a sulfuric acid of about 10% strength results. The mixture is stirred for 1–2 more hours, and then the precipitate is filtered off and washed neutral. The obtained filter cake is worked up into the form of a pigment paste or pigment powder. The thus-prepared pigment dyestuff yields reddish brown shades in spin-dyeing.

If the 1-N-(Bz-1'-benzanthronyl)-amino-5-aminoanthraquinone is replaced by the equivalent quantity of 1 - N - (Bz - 1' - benzanthronyl) - amino - 8 - aminoanthraquinone or of 1-N-(Bz-1'-benzanthronyl)-amino-4-methoxyanthraquinone or of the technical mixture of 1-N - (Bz - 1' - benzanthronyl) - amino - 5 - (8) - amino-6-(7)-methylanthraquinone (prepared by the condensation of one mol of Bz-1-bromobenzanthrone with one mol of the technical mixture of 1,5-diamino-2-methylanthraquinone and 1,8-diamino-2-methyl-anthraquinone), similar dyestuffs are obtained.

Example 9

200 parts of 1-N-(Bz-1'-benzanthronyl)-aminoanthraquinone are dissolved in the six-fold quantity of sulfuric acid of 92–100% strength, and the solution heated to 70–110° for several hours. The sulfuric acid solution is then slowly poured into a vigorously agitated solution, at 30–60°, of 30–40 parts of sodium chlorate or of a corresponding quantity of sodium bichromate in 12,000 parts of water. The precipitation mass is stirred for a little time longer at 60–80°, and the resultant pigment dyestuff filtered off and washed neutral. It is then worked up after the manner hereinbefore described into the form of a pigment paste or of a pigment powder, which may be used to color artificial silk and paper in bulk or pulp form in brownish golden-orange shades.

Suitable dispersing agents, which may be employed for converting the 1-N-(benzanthronyl)-aminoanthraquinones into pigment paste or powder form, are, in addition to the previously mentioned condensation product of naphthalene disulfonic acid and formaldehyde, are for example also the alkylpolyglycolethers with 20–25 ethenoxy groups, such as cetylpolyglycolether, stearylpolyglycolether and oleylpolyglycolether, alkylphenylpolyglycolethers such as dodecylphenylpolyglycolether, alkylarylsulfonates such as alkylbenzenesulfonates and alkylnaphthalenesulfonates, sulfonated oils, fatty acid condensation products, high molecular alkyl sulfates and alkyl sulfonates and many others.

Example 10

A medium depth paper coloration is produced by adding 2 parts of a 10% aqueous paste of the pigment dyestuff prepared according to Example 1, to a mixture of 100 parts of bleached sulfite cellulose in 2000 parts of water in a hollander. In order simultaneously to effect vegetable sizing and fixing of the pigment dyestuff onto the paper fibers, 40 parts of a 2.5% rosin soap emulsion and then 40 parts of a 5% aluminum sulfate solution are added to the colored paper mass.

The paper mass can also be dyed or colored, in essentially similar manner, with the dyestuffs of any of the other foregoing examples.

Example 11

A further important field of application of the hereinbefore described pigment dyestuffs resides—as already been mentioned—in the dyeing of synthetic fibers in the form of the spinning mass. The spin-dyeing of viscose artificial silk consists essentially in dyeing the matured viscose solutions by stirring the dyestuff pigment thereinto and then spinning the colored material with the aid of the usual spinning apparatus.

100 parts of a 20% aqueous paste of the pigment dyestuff obtained according to Example 1 are added, in a stirring apparatus to 22,500 parts of an aqueous viscose solution of approximately 9% strength. The dyed spinning mass is then stirred for 15 minutes, deaerated, and subjected to the usual spinning and desulfurizing treatments.

The other hereinbefore disclosed dyestuffs may be similarly used for dyeing spinning masses.

Example 12

A paste, consisting of 100 parts of an aqueous paste (of 20% strength) of a pigment dyestuff obtainable according to Example 2, 400 parts of tragacanth (3%), 400 parts of an aqueous egg albumin solution of 50% strength and 100 parts of a non-ionogenic wetting agent, is printed onto a textile fabric. The print is dried and then steamed for a half hour at 100–101°.

In the printing paste the dyestuff mentioned in the preceding paragraph may be replaced by any of the other hereinbefore described dyestuffs and/or the tragacanth and egg albumin may be replaced by any other binding agents conventionally used for fixing pigments on fibers, such for example as those binding agents which involve synthetic resins.

Having thus disclosed the invention what is claimed is:

1. A pigment dyestuff of the 1-N1(Bz-1'-benzanthronyl)-aminoanthraquinone series which is a condensation product, prepared by bringing an acid condensing agent into intimate contact with a compound which corresponds to the formula

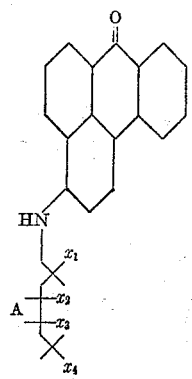

wherein A stands for a residue selected from the group consisting of the 1-amino-5,10-isothiazoleanthone and 1-aminoanthraquinone residues, each of $x_1$, $x_2$, $x_3$ and $x_4$ stands for hydrogen when A is a 1-amino-5,10-isothiazoleanthrone residue and for a member selected from the group consisting of hydrogen, halogen, hydroxy, methoxy, methyl, amino and the radical

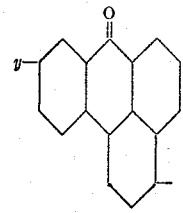

when A is a 1-aminoanthraquinone residue, $y$ being a member selected from the group consisting of hydrogen and halogen, and stirring the resulting reaction mass into an aqueous medium, whereby the resultant condensation product is precipitated.

2. The pigment dyestuff which is a condensation product, prepared by bringing an acid condensing agent into intimate contact with the compound of the formula

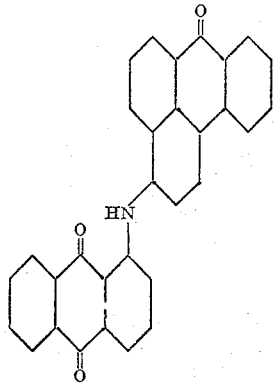

and stirring the resulting reaction mass into an aqueous medium, whereby the resultant condensation product is precipitated.

3. The pigment dyestuff which is a condensation product, prepared by bringing an acid condensing agent into intimate contact with the compound of the formula

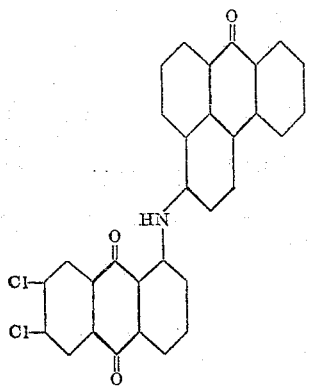

and stirring the resulting reaction mass into an aqueous medium, whereby the resultant condensation product is precipitated.

4. The pigment dyestuff which is a condensation product, prepared by bringing an acid condensing agent into intimate contact with the compound of the formula

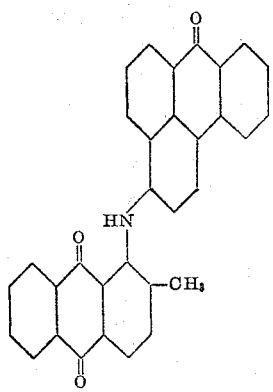

and stirring the resulting reaction mass into an aqueous medium, whereby the resultant condensation product is precipitated.

5. The pigment dyestuff which is a condensation product, prepared by bringing an acid condensing agent into intimate contact with the compound of the formula

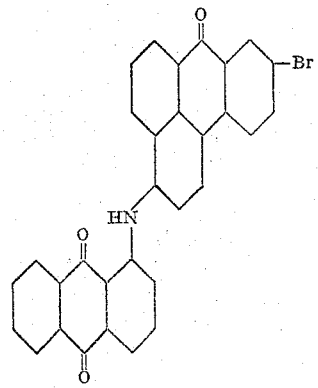

and stirring the resulting reaction mass into an aqueous medium, whereby the resultant condensation product is precipitated.

6. The pigment dyestuff which is a condensation product, prepared by bringing an acid condensing agent into intimate contact with the compound of the formula

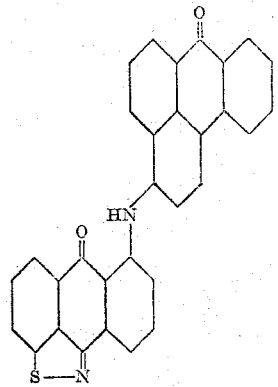

and stirring the resulting reaction mass into an aqueous medium, whereby the resultant condensation product is precipitated.

References Cited in the file of this patent
FOREIGN PATENTS

| | | |
|---|---|---|
| 24,604 | Great Britain | of 1908 |
| 280,886 | Great Britain | Jan. 28, 1929 |
| 743,509 | Great Britain | Jan. 18, 1956 |